United States Patent [19]

Stark

[11] Patent Number: 5,772,214
[45] Date of Patent: Jun. 30, 1998

[54] AUTOMATIC SHUT DOWN SEAL CONTROL

[75] Inventor: Michael A. Stark, Syracuse, N.Y.

[73] Assignee: Carrier Corporation, Syracuse, N.Y.

[21] Appl. No.: 631,358

[22] Filed: Apr. 12, 1996

[51] Int. Cl.$^6$ ............................................. F16J 15/34
[52] U.S. Cl. ........................................... 277/28; 277/30
[58] Field of Search ......................... 277/2, 3, 9.5, 28, 277/30, 81 R

[56] References Cited

U.S. PATENT DOCUMENTS

| | | | |
|---|---|---|---|
| 1,330,416 | 2/1920 | Wilfley | 277/28 |
| 1,947,017 | 2/1934 | McHugh | 277/28 |
| 2,254,862 | 9/1941 | Watson et al. | 277/28 |
| 2,602,680 | 7/1952 | Church | 277/28 |
| 2,631,050 | 3/1953 | Haberlein | 277/28 |
| 3,069,173 | 12/1962 | Best | 277/28 |
| 4,106,778 | 8/1978 | Cormack et al. | 277/9.5 |
| 4,161,316 | 7/1979 | Nowack et al. | 277/9 |
| 5,303,933 | 4/1994 | Larkins | 277/9.5 |

Primary Examiner—Scott Cummings

[57] ABSTRACT

An apparatus for automatically closing a shutdown seal on an open-drive centrifugal compressor to prevent the loss of refrigerant and damage to the seal, including a seal housing encompassing a rotor shaft, containing a shutdown seal and a running seal; the rotor shaft driven by a motor and axially moveable between the shutdown and running position, the shutdown position illustrated by the shutdown seal in the closed position and the running seal in the open position, the running position illustrated by the shutdown seal in the open position and the running seal in the closed position; a pressurized oil supply to move the shaft between the shutdown and running positions; a first sensor to determine when the motor is operating; a second sensor to measure the oil pressure; a solenoid controlling a release valve to remove pressure from the oil supply to move the shaft from the running position to the shutdown position once the motor has been inoperative for a given period of time and the oil pressure has fallen below a given pressure.

5 Claims, 4 Drawing Sheets

//2

AUTOMATIC SHUT DOWN SEAL CONTROL

BACKGROUND OF THE INVENTION

This invention relates generally to an open drive centrifugal compressor for use in a refrigeration system, and in particular to an automatic system for shutting down a centrifugal compressor in a controlled sequence to protect the shut down seal and to reduce and/or eliminate the loss of refrigerant from the machine.

Many centrifugal chillers in use today employ open drive compressor's wherein the shaft carrying the machine rotor passes out of the machine casing and is coupled to an exterior drive. As a result, the compressor rotor passes from the higher pressure refrigerant environment to atmosphere. Typically, an open drive compressor will have a pair of seals that remain in contact with the rotor shaft at all times, one when the machine is running or the other when idle. The present assignee has developed an improved sealing arrangement for an open drive machine wherein the rotor is shifted from a first position when the machine is in a shut down mode and a second position when the machine is in a running mode. This arrangement allows for the use of a shutdown seal that is operable only when the rotor is in the first shutdown position and a second running seal that is operable only when the rotor is in the second running position. This sealing arrangement works well in practice and permits the use of better shutdown seal materials, however, these shutdown seals are relatively motion sensitive and will become damaged in the event the rotor is moved into a shutdown position when the machine shaft is still turning.

In the past, movement of the rotor was accomplished manually by operating a valve for controlling the delivery of high pressure oil as a motive force for moving the rotor assembly. Manual operation of the shutdown system is, of course, subject to human error and damage to the shutdown seal can occur anytime the shutdown sequence is not properly carried out.

As will become apparent from the disclosure below, the present invention involves an automatic apparatus for shutting down an open drive centrifugal machine that retains all the advantages of a shutdown seal containing motion sensitive materials.

SUMMARY OF THE INVENTION

The primary object of the present invention is to improve open drive centrifugal compressors.

A further object of the present invention is to protect the shutdown seal of an open drive centrifugal compressor from becoming damaged.

A still further object of the present invention, is to provide an automatic shutdown sequence for an open drive centrifugal compressor.

Another object of the present invention is to minimize the loss of refrigerant from an open drive centrifugal compressor.

These and other objects of the present invention are attained by means of apparatus for automatically shutting down a centrifugal refrigerant compressor. The apparatus includes a hydraulic unit for shifting the rotor of the machine from a first running position to a second shutdown position. Movement to the shutdown position requires relieving oil pressure that is acting against the rotor and allowing pressurized refrigerant in the compressor to move the rotor back against a shutdown seal. A solenoid valve, when energized, will open and thus relieve the oil pressure acting on the rotor allowing the rotor to move into the shutdown position.

Energization of the solenoid valve is controlled by a seal oil supply pressure switch and a run contact switch in the main motor starter. If either of the switches are closed, a seal relay will be energized holding the solenoid valve closed and thus hold the rotor in an operating mode until such time as the rotor has stopped turning and the seal oil supply pressure is shutdown.

BRIEF DESCRIPTION OF THE DRAWING

For a better understanding of these and other objects of the present invention reference shall be made to the following detailed description of the present invention which is to be read in association with the accompanying drawings, wherein.

DESCRIPTION OF THE INVENTION

Figure 1:
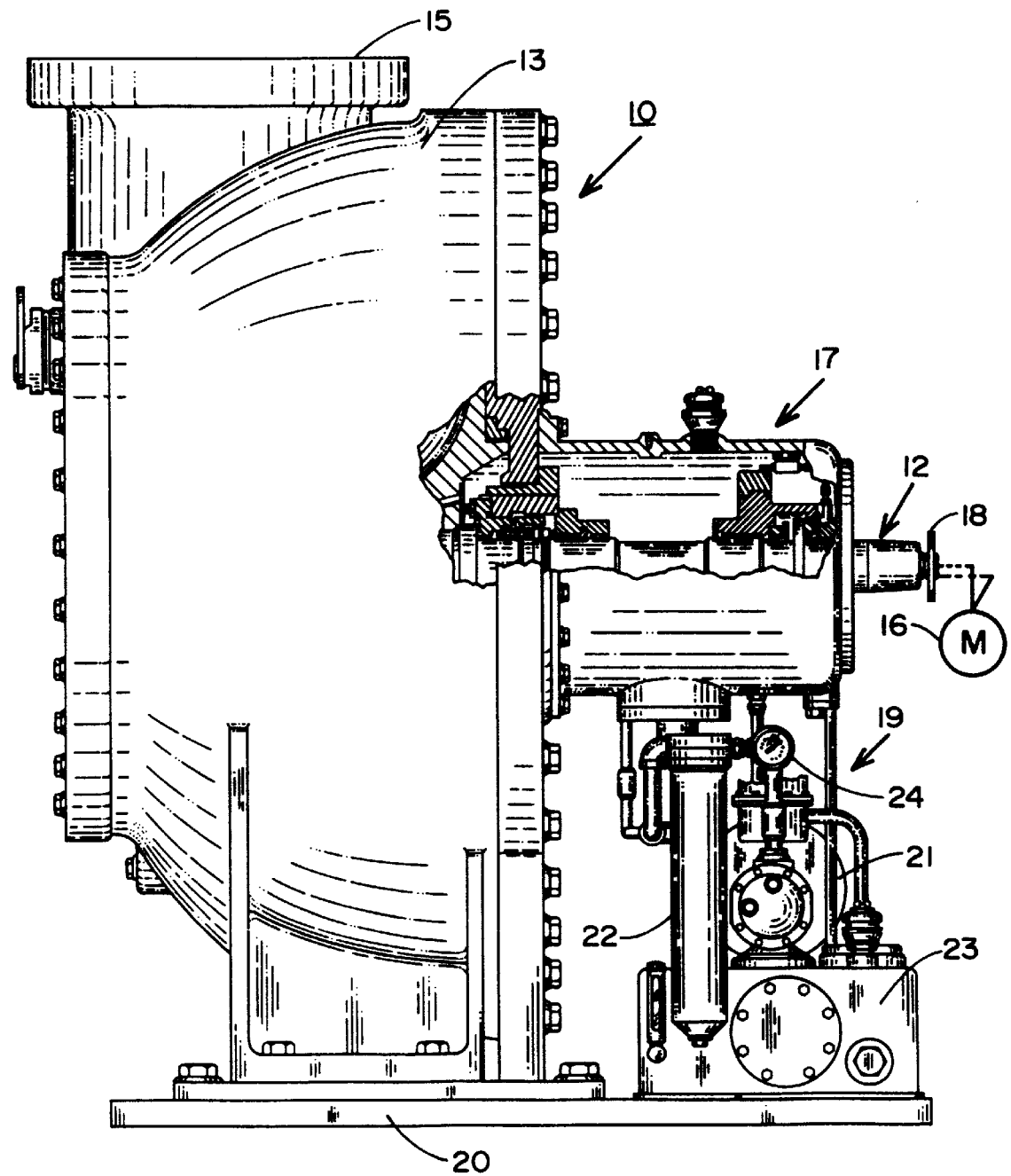
FIG. 1 is a side elevation of a centrifugal chiller compressor with portions broken away embodying the teachings of the present invention.

Turning initially to FIG. 1 there is shown a centrifugal compressor, generally referenced 10, that is used to compress refrigerant used in a chiller system. The compressor contains, in this embodiment, a single stage centrifugal impeller (not shown) that is supported upon a rotor shaft 12. The impeller is housed within a casing 13 and arranged to discharge high pressure refrigerant to a condenser via discharge port 15. The rotor shaft passes out of the casing through the bearing and seal housing 17 and is connected to an electric drive motor 16 via drive coupling 18. The coupling is able to move axially to permit the rotor shaft to be repositioned between a shutdown mode and a running mode. As noted above, the centrifugal compressor is an open drive machine specially designed for large capacity air conditioning applications.

An atmospheric lubrication system 19, for providing bearing and seal oil under pressure, is mounted upon the compressor base 20 beneath the bearing and seal housing 17. The system includes a motor driver pump 21, an oil cooler and filter unit 22 and an oil reservoir 23. Also included in the lubrication system are instruments 24 for sensing and indicating oil temperature and pressure of various places in the system.

Figure 2:
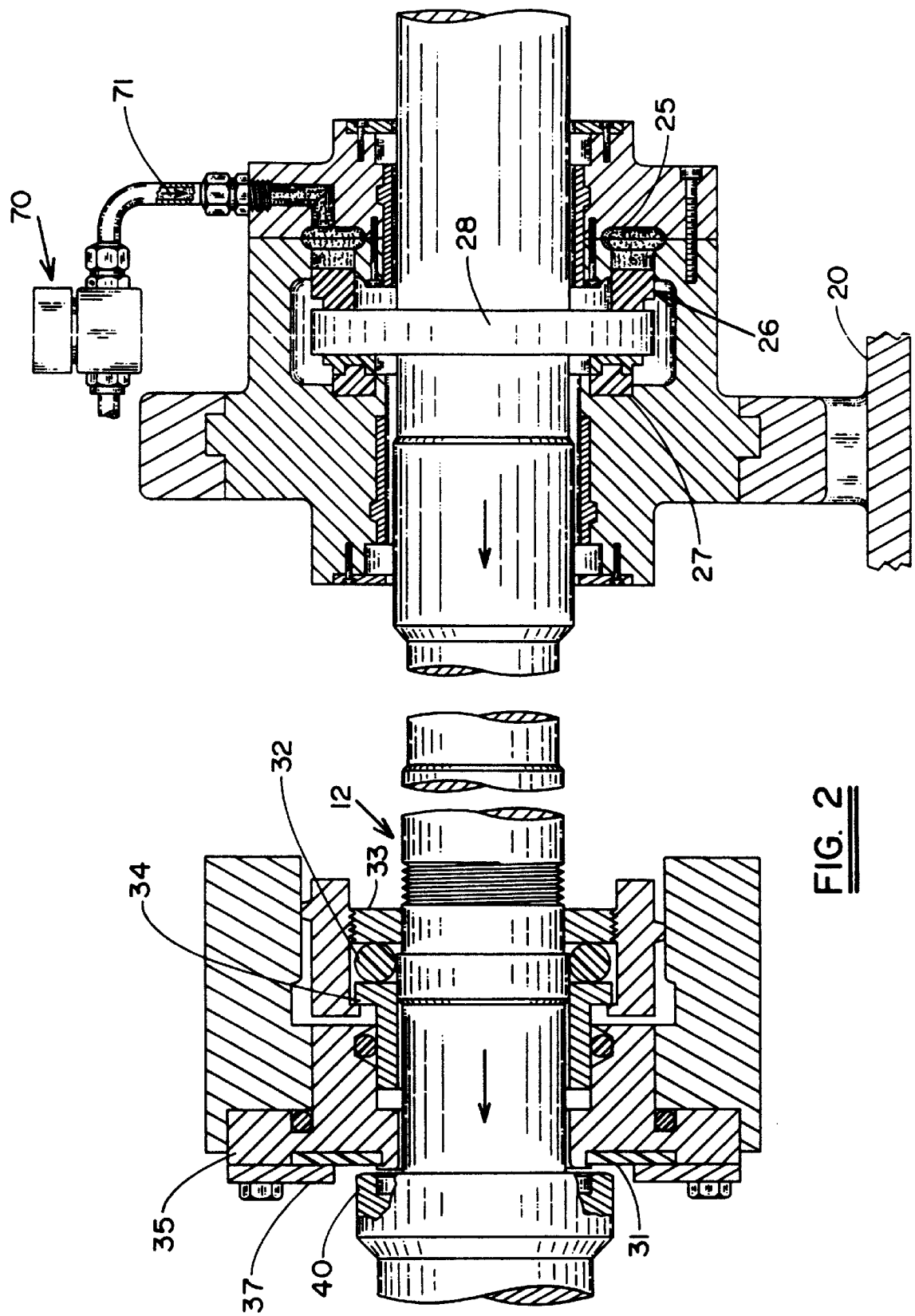
FIG. 2 is also an enlarged partial side elevation showing the present rotor structure in an operating mode.
Figure 3:
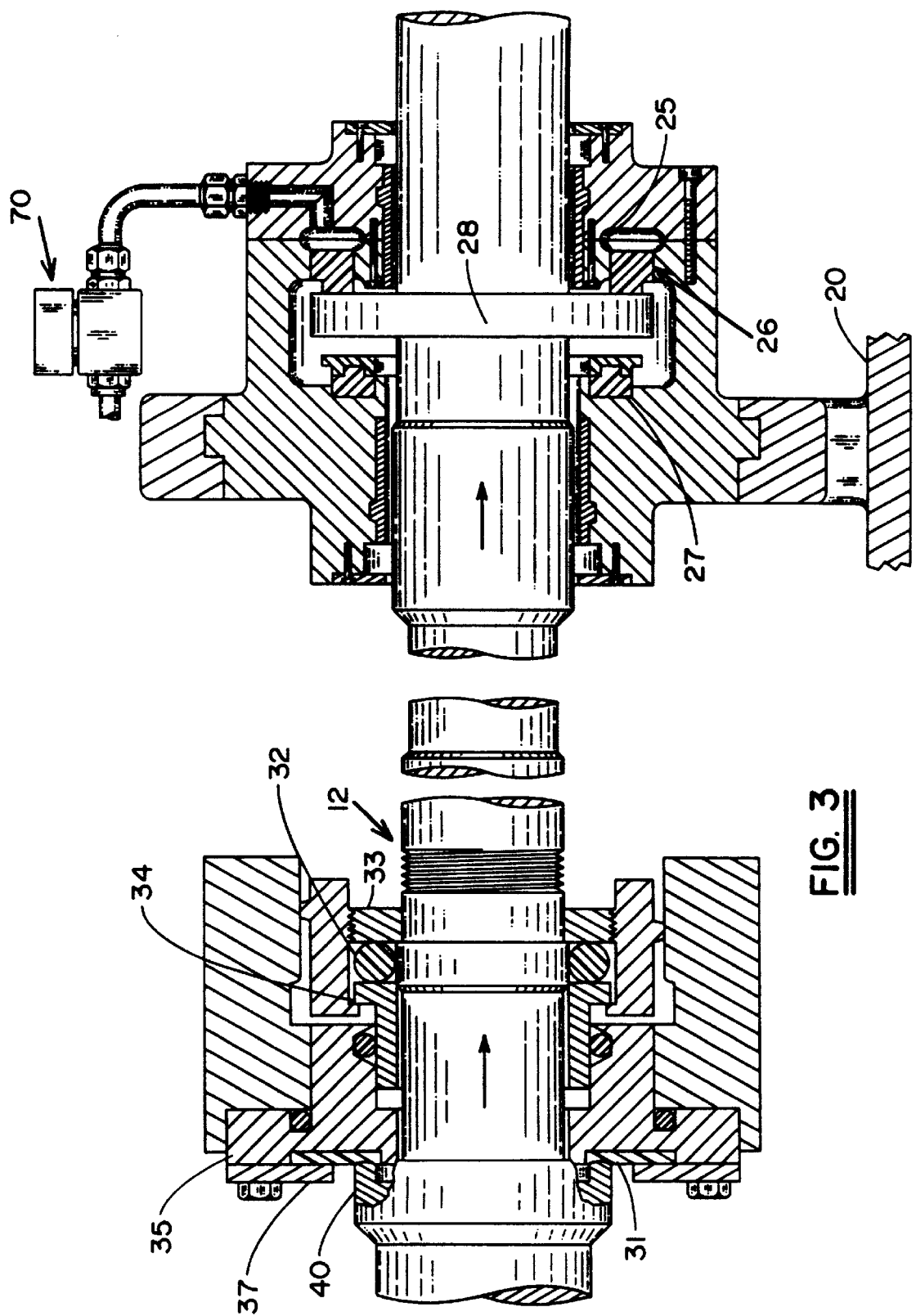
FIG. 3 is an enlarged partial side elevation showing the rotor structure of the machine illustrated in FIG. 1 in a shutdown mode.

With further reference to FIGS. 2 and 3, high pressure oil from the lubrication system pump is delivered into cavity 25 behind counter thrust bearing unit 26 via a suitable supply line (not shown). The oil pressure behind the bearing unit applies an axial force against the radially disposed thrust disc 28 affixed to the rotor shaft to move the rotor assembly axially between the shutdown mode shown in FIG. 3 and a running mode shown in FIG. 2. A modified Kingsbury thrust bearing 27 is mounted in front of the thrust disc which is self aligning.

As illustrated in FIG. 2, the bearing and seal housing 17 contains an inboard bearing unit containing a running seal 32 and a stationary shutdown seal 31. The running seal may be an O ring seal which is compressed into sealing contact between radially extended members 33 and 34 when the rotor assembly is placed in the running mode as illustrated in FIG. 2. The running seal serves to prevent refrigerant from escaping from the compression chamber of the machine when the rotor is turning.

The stationary shutdown seal 31 is mounted on the front face of support element 35 and is held in place by annular clamping ring 37 which is bolted onto the face of the support element. The shutdown seal is formed of Teflon or any other suitable material having similar properties. The seal is closed by means of annular axially disposed flange 40 that is secured to the rotor shaft. The Teflon seal works well to provide a positive seal when the flange is brought into contact therewith as shown in FIG. 3 to prevent loss of refrigerant when the machine is in a shutdown mode. The shutdown seal, however, is relatively sensitive to motion and will become damaged if the flange is turning when it is brought into contact therewith. Failure to bring the rotor to a complete stop before closing the seal thus will destroy the seal and permit refrigerant to escape from the machine.

To bring the rotor from the running mode to the shutdown mode, the rotor must be allowed to completely run down and the oil pressure acting on the thrust disc is reduced to a pressure below the refrigerant within the machine whereby the refrigerant pressure forces the rotor assembly back into the shutdown mode. In the past, movement of the rotor assembly between the running and shutdown mode was performed manually by opening a relief valve to release the oil pressure acting upon the thrust disc. However, the manually shutdown procedure is susceptible to human failure. The present invention involves an automatic shutdown controller that eliminates human errors and assures that proper shutdown procedures are followed even in the event of a power failure.

Figure 4:
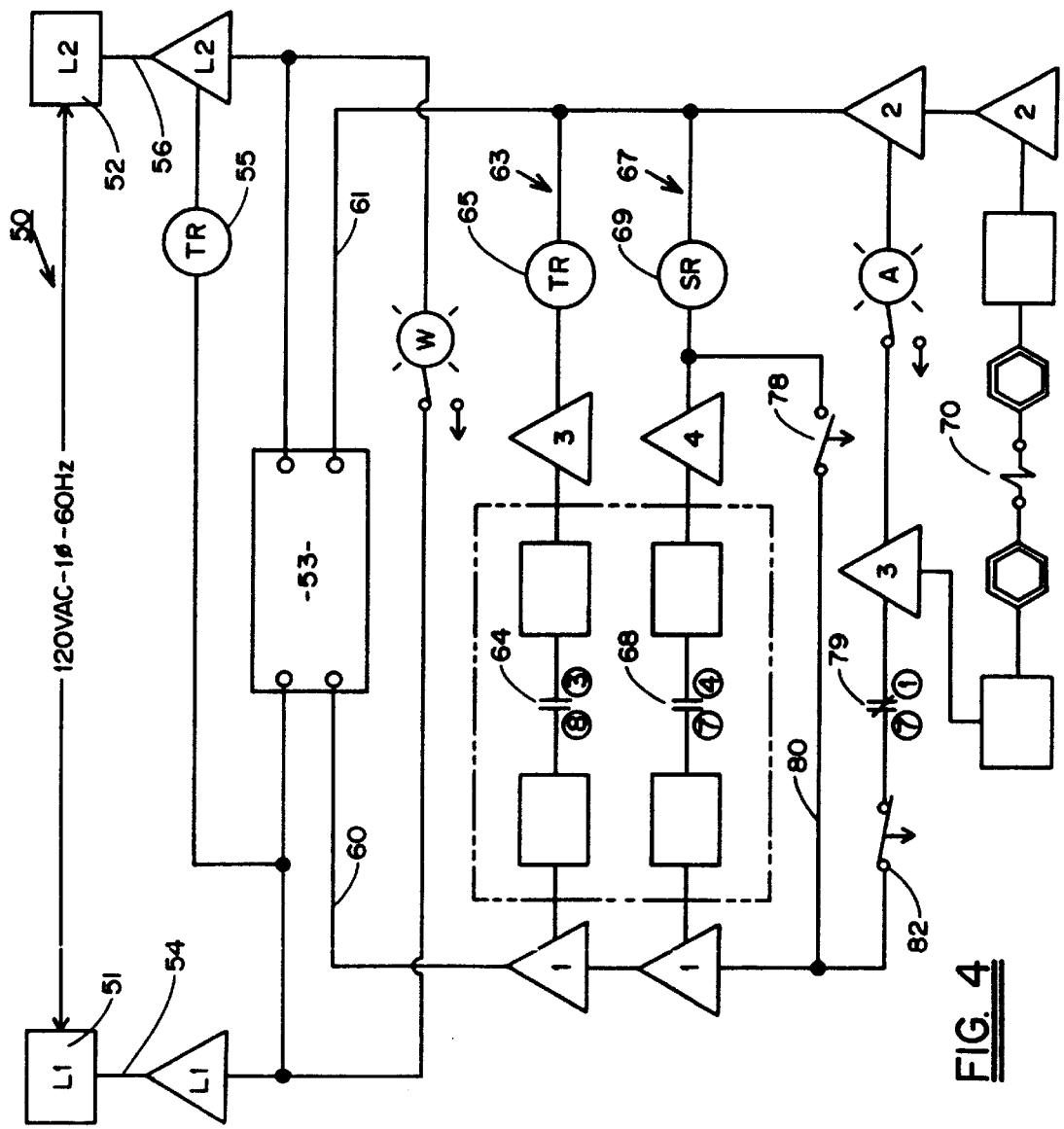
FIG. 4 is a schematic drawing showing the shutdown control circuitry of the present invention.

Turning now to control FIG. 4, there is shown a diagram illustrating circuitry 50 for safely shutting down an open drive compressor of the type described above. Power to the controller is provided by a 120 volt input that is applied to input terminals 51 and 52. An uninterruptable power supply (UPS) 53 is placed over the two input lines 54 and 56 to provide power to the controller circuitry. The uninterrupt power supply contains a 120 V inverter to provide A.C. power to the controller circuitry and a battery which will continue to provide power to circuitry for a sufficient period of time to complete the shutdown procedure in the event of a 120 volt power failure. The UPS contains a green light to indicate that it is operating on 120 line voltage and a red light to indicate when the UPS is operating on internal batteries. A battery timer (TR) 55 is placed over the UPS unit and is set to shut the UPS down after a predetermined period of time which is greater than the period of time required to shutdown the machine, thus saving the battery charge.

The power output of the UPS is applied to lines 60 and 61. A machine run sensor circuit 63 extends between the output lines which contains a machine run contact 64 in the main motor starter circuit and a time relay 65, the function of which will be explained in greater detail below.

A second seal oil supply pressure sensor circuit 67 also extends between the two power output lines and contains a seal oil supply pressure switch 68 and a seal relay (SR) 69.

A solenoid activated valve 70 is connected to an oil cavity situated behind the counter thrust bearing 26. The solenoid, when energized, will open the valve in relief line 71 thus allowing the oil exerting pressure on the thrust disc to return to the oil reservoir, thus allowing the rotor assembly to move back from the running mode position to the shutdown position. The circuitry controlling energization of the solenoid valve requires two conditions to be satisfied. The run signal from the motor must be off for a period of time sufficient to permit the machine to coast to a standstill which, in this case, is five minutes, and the oil pressure must fall below the pressure setting of the seal oil supply pressure sensing switch. The pressure setting of the switch is set below the running oil pump pressure indicating pump shutdown.

When the compressor motor is running, the timer relay 65 is energized, holding the normally open switch 78 to a closed position. This allows current to reach seal relay 69 to open normally closed contact 79 thus maintaining the solenoid in a deenergized condition holding the solenoid valve closed and the rotor assembly in a run mode.

When the compressor is placed in a shutdown mode the compressor motor is deactivated, opening contact 64 and deenergizing timer relay 65 wherein the timer relay begins a countdown five minute sequence during which time the compressor will coast to a complete stop. When the count down sequence is completed switch 78 opens, preventing current from reaching the seal relay through line 80. However, if the pressure sensing switch still detects an oil pressure greater than the preset pressure, the seal relay will remain energized, keeping contact 79 open.

When the motor has been shutdown for the given period and the pressure switch is opened allowing contact 79 to close, energizing the solenoid whereupon the solenoid opens relieving the oil pressure on the thrust disc. This, in turn, permits the rotor assembly to move back to the shutdown mode closing the shutdown seal.

A time relay 55 in the UPS bypass line will become energized after about an eight minute delay which, in turn, causes normally closed contact 82 to open, thus allowing the solenoid to become deenergized, preserving the battery charge in the UPS in the event the shutdown was caused by a power failure.

The following is a logic table illustrating the controller component setting under various conditions.

| RUN SIGNAL 64 | OIL PRESSURE Switch 68 | TIMER DELAY 78 | SEAL RELAY 69, 79 | SOLENOID 70 | SEAL POSITION |
|---|---|---|---|---|---|
| System off, no oil pressure | | | | | |
| Open | X | X | X | | |
| Closed | | | | X | SHUT |
| System off, oil pressure | | | | | |
| Open | X | | X | X | RUN |
| Closed | | X | | | X |
| System run, oil pressure | | | | | |
| Open | | | | X | RUN |
| Closed | X | X | X | | X |
| System off, less than timer setting, oil pressure | | | | | |
| Open | X | | | X | RUN |
| Closed | | X | X | | X |
| System off, greater than timer setting, oil pressure | | | | | |
| Open | X | | | X | RUN |
| Closed | | X | X | | X |
| System on, no oil pressure | | | | | |
| Open | | X | | X | RUN |
| Closed | X | | X | | X |

-continued

| | RUN SIGNAL 64 | OIL PRESSURE Switch 68 | TIMER DELAY 78 | SEAL RELAY 69, 79 | SOLENOID 70 | SEAL POSITION |
|---|---|---|---|---|---|---|
| Total power failure, less than timer setting | | | | | | |
| Open | X | X | | X | | RUN |
| Closed | | | X | | X | |
| Total power failure, greater than timer setting | | | | | | |
| Open | X | X | X | | X | |
| Closed | | | | | X | SHUT |

Prior to starting the compressor after an automatic shutdown sequence has been completed, the seal relay contact is checked by a sensor means to insure that the contact is open and the solenoid actuated valve is closed, allowing the rotor assembly to be moved back to the running mode prior to starting the compressor motor, thus preventing the shutdown seal from being damaged.

While this invention has been explained with reference to the structure disclosed herein, it is not confined to the details set forth and this invention is intended to cover any modifications and changes as may come within the scope of the following claims:

What is claimed is:

1. Apparatus for automatically closing a shutdown seal for an open-drive centrifugal compressor that compresses a fluid that includes
    a seal housing encompassing a rotor shaft, said housing containing a shutdown seal and a running seal;
    said rotor shaft driven by a motor and axially moveable between a first and second position, said first position defined by said shutdown seal in the closed position and said running seal in the open position, said second position defined by said shutdown seal in the open position and said running seal in the closed position;
    means for applying a hydraulic pressure against said shaft to move said shaft from said first position to said second position;
    first sensing means to determine when said motor is operating;
    second sensing means to measure the oil pressure applied to said shaft;
    relief means responsive to said first sensing means and said second sensing means for removing hydraulic pressure from said shaft when said sensing means determines said motor has been inoperative for a given period of time and the oil pressure determined by said second sensing means has fallen below a given pressure;
    whereby said shaft is forced by compressed fluid from said second position to said first position.

2. The apparatus according to claim 1 wherein said relief means includes a solenoid to release oil pressure from said shaft area to allow said shaft to move from said second position to said first position.

3. The apparatus according to claim 2 wherein said relief means includes a circuit control comprising
    a power source providing current flow and having a battery backup;
    a compressor run contact detecting the compressor mode as run or shutdown;
    an oil pressure contact detecting whether oil pressure is lower than a preset pressure switch setting;
    timer means that is triggered when said compressor shuts down, said timer means directed to count down a preset amount of time;
    a seal relay which is activated when said timer means has finished counting and said oil pressure is lower than said pressure switch setting;
    a seal relay gate normally open, said seal relay gate triggered to close and allow current passage when said seal relay is activated;
whereby current flows to open said solenoid, thus relieving oil pressure and closing the shutdown seal.

4. The apparatus of claim 2 wherein said relief means further includes a battery saver time delay, said battery saver time delay measures a preset amount of time after an incoming power loss and cuts off power to the solenoid, whereby batteries are prevented from being drained during a power failure while allowing the seal to be closed beforehand.

5. The apparatus of claim 3 wherein said circuit control further includes
    a green indicator light, said green indicator light illuminated whenever said circuit is powered;
    a red indicator light, said red indicator light blinking whenever said circuit is operating only on battery backup.

* * * * *